United States Patent
Kurosaki et al.

(10) Patent No.: US 6,749,963 B2
(45) Date of Patent: Jun. 15, 2004

(54) SECONDARY BATTERY UTILIZING INDOLE COMPOUNDS

(75) Inventors: Masato Kurosaki, Tokyo (JP); Toshihiko Nishiyama, Tokyo (JP); Hiroyuki Kamisuki, Tokyo (JP); Gaku Harada, Tokyo (JP); Yuuji Nakagawa, Tokyo (JP); Shinya Yoshida, Tokyo (JP); Tomoki Nobuta, Tokyo (JP); Masaya Mitani, Tokyo (JP)

(73) Assignee: NEC Tokin Corporation, Miyagi (JP)

( * ) Notice: Subject to any disclaimer, the term of this patent is extended or adjusted under 35 U.S.C. 154(b) by 203 days.

(21) Appl. No.: 09/942,991

(22) Filed: Aug. 31, 2001

(65) Prior Publication Data

US 2002/0058185 A1 May 16, 2002

(30) Foreign Application Priority Data

Sep. 18, 2000 (JP) .................................... 2000-282309

(51) Int. Cl.$^7$ ................................................ H01M 4/60
(52) U.S. Cl. ....................... 429/213; 361/508; 361/516; 361/528; 361/532
(58) Field of Search ......................... 429/213; 361/508, 361/516, 528, 532

(56) References Cited

FOREIGN PATENT DOCUMENTS

| JP | 9-508487 | 8/1997 |
|---|---|---|
| JP | 10-289617 | 10/1998 |
| JP | 11-126609 | 5/1999 |
| JP | 11-144732 | 5/1999 |
| JP | 11-288717 | 10/1999 |
| JP | 2001-118577 | 4/2001 |
| KR | 10-0374679 | 2/2001 |

OTHER PUBLICATIONS

Mount et al. "The Redox Reaction and Induced structural Changes of 5–substituted Indole Films", Phys. Chem. Phys, 1999, 1, pp. 5169–5177.*

* cited by examiner

*Primary Examiner*—Laura Weiner
(74) *Attorney, Agent, or Firm*—Sughrue Mion, PLLC

(57) ABSTRACT

The present invention provides a secondary battery and a capacitor which may provide an excellent high rate and cycle characteristic as well as sufficient electromotive force and capacity. The secondary battery and a capacitor have an active material of an electrode comprising a trimer compound comprising three units of indole or indole derivatives in condensed ring form, wherein the second position and the third position of each unit form a six-membered ring, and a proton which can be utilized as a charge carrier of the trimer compound.

6 Claims, 3 Drawing Sheets

SECONDARY BATTERY UTILIZING INDOLE COMPOUNDS

TECHNICAL FIELD

The present invention relates to a secondary battery and a capacitor, more particularly utilizing an indole compound as an active material of an electrode and a proton as a charge carrier.

BACKGROUND OF THE INVENTION

Indole polymers are known as excellent materials for an active material of electrode in the light of electromotive force and capacity. However, the battery wherein the indole polymers are utilized as an active material has not been satisfactory in the light of a rapid charge and discharge and a cycle characteristic.

SUMMARY OF THE INVENTION

According to the present invention, a battery and a capacitor which may provide an excellent high rate and cycle characteristic as well as sufficient electromotive force and capacity can be provided.

According to one aspect of the present invention, the invention provides a secondary battery and a capacitor having an active material of an electrode comprising a trimer compound comprising three units of indole or indole derivatives in condensed ring form, wherein the second position and the third position of each unit form a six-membered ring, and a proton which can be utilized as a charge carrier of the trimer compound.

According to another aspect of the present invention, the invention provides a secondary battery and a capacitor comprising:
  a first electrode with a first electrode active material;
  a second electrode with a second electrode active material; and
  an electrolyte intermediate between the first electrode and the second electrode, the electrolyte including a proton source material;
  wherein the first electrode active material and the second electrode active material undergo a reversible oxidation-reduction reaction, and
  both or one of the first and second electrode active materials comprise a trimer compound comprising three units of indole or indole derivatives in condensed ring form, wherein the second position and the third position of each unit form a six-membered ring.

According to another aspect of the present invention, the invention provides a secondary battery and a capacitor, wherein the receipt and release of electrons in accordance with the oxidation-reduction reaction of the trimer compound are carried out only by the bonding and elimination of the proton bonded to the trimer compound.

DETAILED DESCRIPTION OF THE EMBODIMENTS

Figure 1:
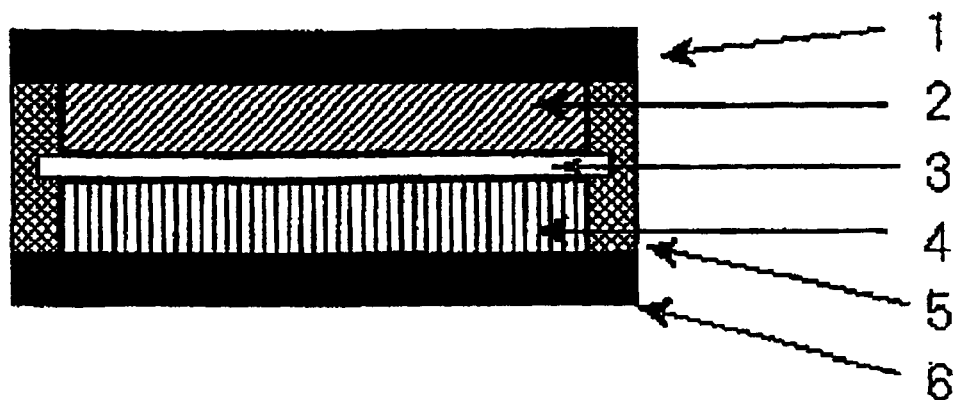
FIG. 1 is a schematic cross section showing a working example of a battery and a capacitor of this invention.

Preferred embodiments of the invention are explained in the following:

FIG. 1 is a cross section of a secondary battery or a capacitor according to this invention. A positive electrode material layer 2 and a negative electrode material layer 4, which are formed on a current collector 1 and a current collector 6 respectively, are arranged so as to face each other via a separator 3; there are provided a gasket 5 made of insulating rubber on the side of the layers wherein the positive electrode material layer 2 and the negative electrode material layer 4 are piled via the separator 3. The positive electrode material layer 2 (positive electrode) and the negative electrode material layer 4 (negative electrode) are each impregnated with an electrolyte solution containing protons.

A trimer compound, wherein bonds are formed among the second position and the third position of each unit of indole or indole derivatives, hereinafter described as an "indole trimer" can be represented by the following general formula (1):

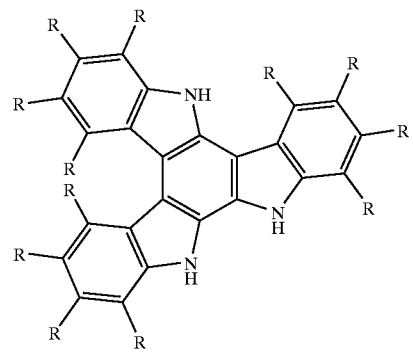

(1)

wherein each R represents a hydrogen atom or a substituent, independently.

The indole trimers can be prepared by known electrochemical or chemical methods utilizing known reactions such as electrochemical oxidation, chemical oxidation, condensation reaction and substitution reaction depending on the substituents from, for example, indole or indole derivatives, hereinafter described as an "indole monomer" represented by general formula (2) shown below. The indole trimers are prepared usually from indole monomers wherein each R attached to the second position and the third position is a hydrogen atom.

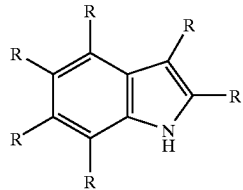

(2)

wherein each R represents one of a hydrogen atom, halogen atom, hydroxyl, carboxyl, sulfonic acid group, sulfuric acid group, nitro, cyano, alkyl, aryl, alkoxyl, amino, alkylthio and arylthio, independently.

The indole trimers in this invention can be represented by, for example, general formula (1) wherein each R represents a hydrogen atom, halogen atom, hydroxy, carboxyl, sulfonic acid group, sulfuric acid group, nitro, cyano, alkyl, aryl, alkoxyl, amino, alkylthio and arylthio, independently. The substituents R in general formula (1) may originate from indole monomers utilized as raw materials.

The halogen atoms of R in general formulas (1) and (2) are, for example, fluorine, chlorine, bromine, and iodine. Alkyl groups of R in the formulas are, for example, methyl, ethyl, propyl, isopropyl, n-butyl, s-butyl, isobutyl, t-butyl, n-pentyl, n-hexyl, n-heptyl and n-octyl. Alkoxyl groups of R in the formulas are groups represented by -OX wherein X are, for example, the alkyl groups described above. Aryl groups of R in the formulas are, for example, phenyl, naphthyl, anthryl and phenanthryl. Alkyl groups in the alkylthio groups of R in the formulas are, for example, the alkyl groups described above. Aryl groups in the arylthio groups of R in the formulas are, for example, the aryl groups described above.

A conductive auxiliary material is added to the electrodes to provide them with electrical conductivity, if necessary. The conductive auxiliary material is, for example, an electrical conductive material such as, crystal carbon, carbon black and graphite. Furthermore, binder may be added to keep moldability of the electrodes and to fix these materials on a current collector.

Mixing ratio of constituting materials in the electrodes may be arbitrary as long as the required characteristic is obtained. However, in the light of an efficiency per unit weight or volume a preferable composition ranges 30 to 95 wt % of an indole trimer, 5 to 50 wt % of a conductive auxiliary material and 0 to 20 wt % of a binder.

An aqueous or nonaqueous solution containing protons is preferably used as an electrolyte solution, so that the protons may be used as charge carriers of indole trimers. Furthermore, a concentration of protons in the electrolyte solution is preferably $10^{-3}$ mol/l to 18 mol/l. Salt or surface active agents may be added to the electrolyte solution to increase the electric conductivity or other properties.

Any material having an electrical insulating property and having or providing ionic conductivity, for example, a porous film made of polyethylene or polytetrafluoroethylene is used as a separator saturated with an electrolyte solution. An electrolyte such as a gel electrolyte or solid electrolyte as sandwiched between the electrodes may be substituted for the separator.

The indole trimer in this invention is doped by an electrochemical or a chemical method as illustrated by the reaction formula described below. $X^-$ in the formula represents a dopant ion, for example, a sulfuric ion, a halide ion, a perchloric ion and trifluoroacetic ion and is not limited to these ions as long as it provides the indole trimer with an electrochemical activity by doping.

Reaction formula 1

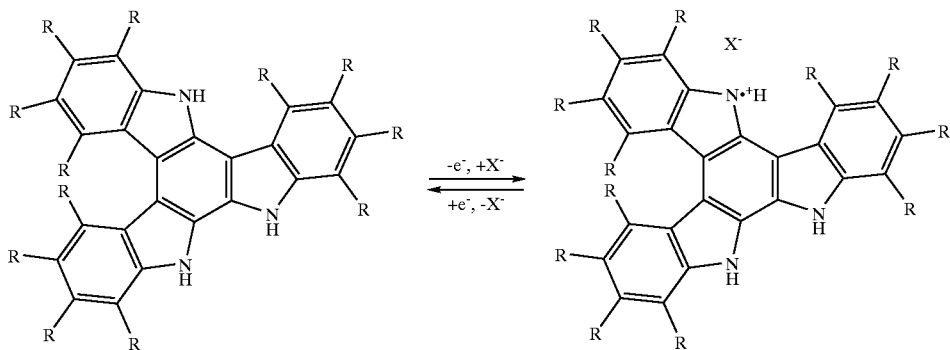

The indole trimer doped by this method generates an electrochemical reaction accompanied with an adsorption and desorption of a proton as illustrated by the following reaction formula 2. Only the adsorption and desorption of a proton in the indole trimer concern with the receipt and release of electrons accompanied with an oxidation-reduction reaction of the indole trimer. Since a transfer material in the electrochemical reaction is only a proton in the battery and the capacitor of this invention using the indole trimer as an electrode material wherein the electrochemical reaction occurs, a volume change of electrodes accompanying the reaction is less and has an excellent cycle characteristic. Furthermore, a high mobility of a proton and a rapid chemical reaction result in an excellent high rate characteristic, i.e., a characteristic of a rapid charge and discharge of the battery.

Reaction formula 2

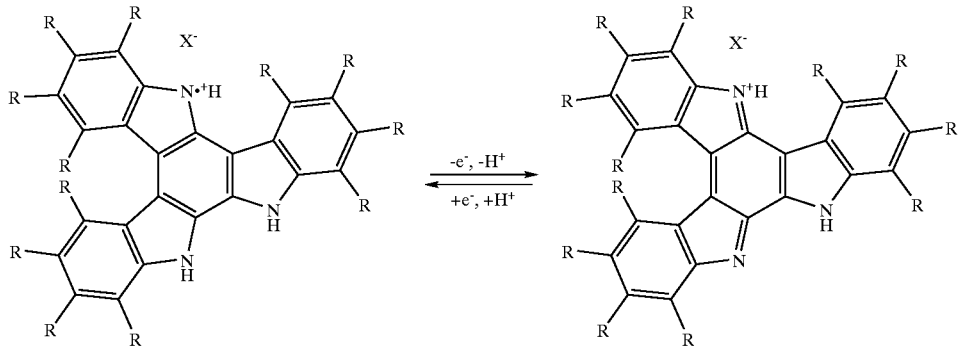

The followings are examples of the battery in this invention which are explained in more detail, and it may also be possible to construct a structure suitable for a capacitor by setting the capacity and the rate of charge-discharge properly.

EXAMPLE 1

FIG. 1 shows a battery having the structure described above which was manufactured according to a usual method. Gaskets 5 made of insulating rubber were used as exterior material and current collectors 1 and 6 were made of conductive rubber. A separator constituted of porous film impregnated with an electrolyte solution of 40% sulfuric acid was used.

An indole trimer consisting of a 6-nitroindole trimer was used as an active material in the positive electrode material layer 2 and carbon fibers grown in gas phase were used as a conductive auxiliary material therein.

Quinoxaline polymer represented by the formula described below was used as an active material in the negative electrode material layer 4 and carbon black was used as a conductive auxiliary material therein. When an indole trimer is used in the positive electrode, an active material used in the negative electrode is not limited to the material if it is active electrochemically and undergoes a reversible oxidation-reduction reaction. A mixing ratio of an active material to a conductive auxiliary material constituting electrodes was chosen as weight ratio of 75:25 (an active material: a conductive auxiliary material) both in the positive and the negative electrodes.

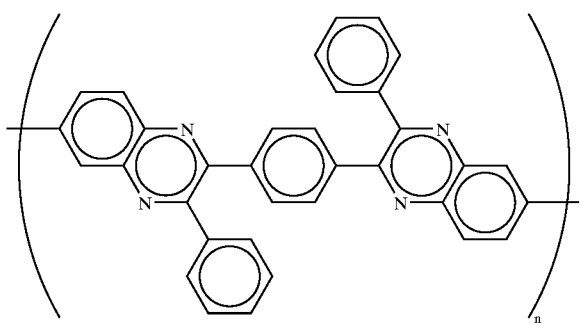

Figure 2:
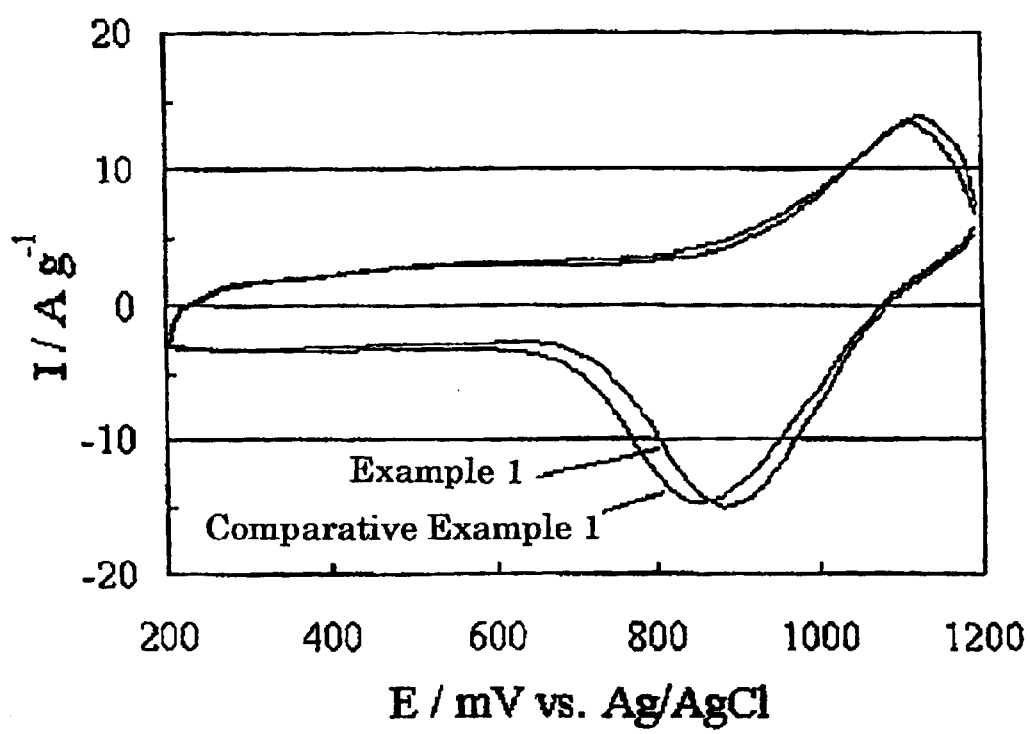
FIG. 2 is the cyclic voltamogram of the positive electrodes in the example 1 and the comparative example 1.

FIG. 2 shows a cyclic voltamogram (hereinafter described as "CV") of the positive electrode material layer 2 in an acid aqueous solution. In the reaction range 1 (200–800 mV vs. Ag/AgCl) doping and dedoping of dopant ions occur as represented by the reaction formula 1 and an electric current associated with them is observed.

In the reaction range 2 (800–1200 mV vs. Ag/AgCl) adsorption and desorption of protons occur as represented by the reaction formula 2.

Figure 3:
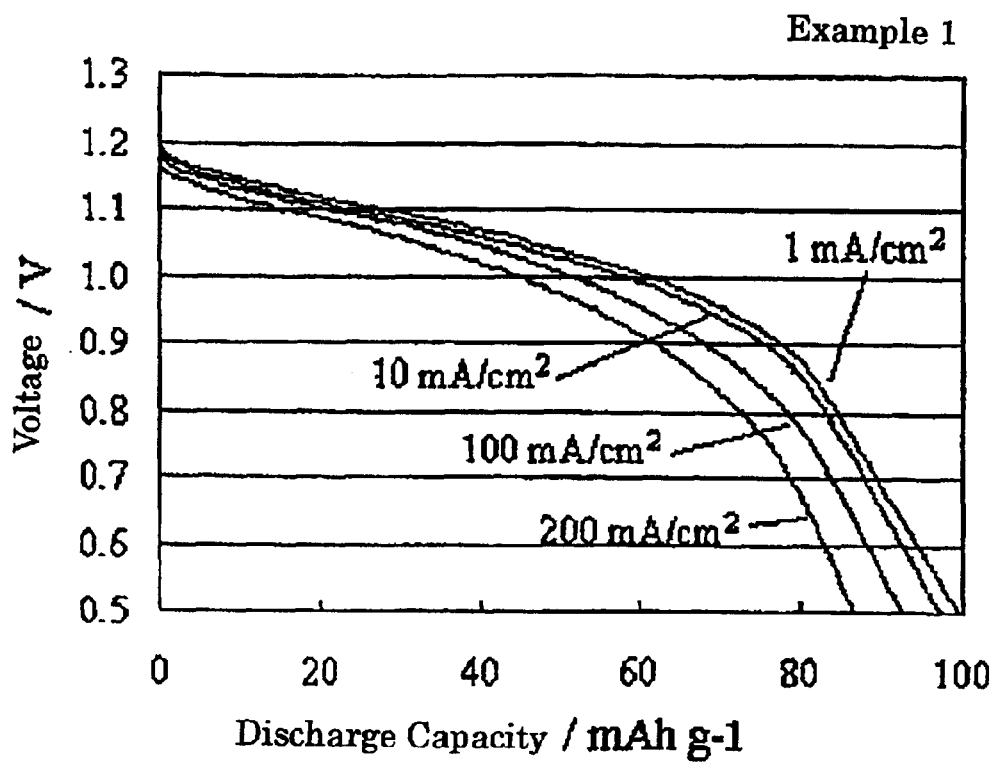
FIG. 3 is the graph showing the results of charge and discharge tests (discharge curves) of the battery in the example 1.

Charge and discharge tests were conducted to evaluate the battery manufactured. A charging was conducted up to 1.2 V at a constant electric current of 10 mA/cm$^2$ and discharging was conducted at constant electric currents of 1 mA/cm$^2$ to 200 mA/cm$^2$. The results of the tests are shown in FIG. 3. The discharge capacities are based on the weight of active material. The tests results of discharge capacities down to 0.9V are shown in Table 1.

An increase in a discharge current from 1 MA/cm$^2$ to 200 MA/cm$^2$ resulted in a decrease in the discharge capacity from 78 mAh/g to 62 mAh/g with a decreasing rate of only 20%. The battery of this invention using an indole trimer in the positive electrode exhibited an excellent high rate characteristic.

Cycle tests were conducted repeating charging up to 1.2 V and discharging down to 0.9 V at a constant charge-discharge current of 10 mA/cm$^2$. As a result of the tests the number of cycles was 31000 until the final capacity reached 80% of the initial capacity. The battery of this invention using an indole trimer in the positive electrode had an excellent cycle characteristics.

An indole trimer, which has a constant molecular weight and molecular size, is different from an active material of a polymer having a molecular weight distribution and can exist in a crystallized structure or in a similar arrangement in an electrode. The transfer path of a reacting ion, i.e., a proton in the electrode is, therefore, nearly linear and its decrease in the mobility is less. On the other hand, the polymer material in the electrode is in an amorphous state and the transfer path of a reacting ion has to be bypassed by polymer chains arranged at random. Furthermore, in the case of using the indole trimer as an electrode material the conductivity of the electrode is higher and the transfer of electrons is easier than in the case of using indole polymers as shown in Table 1. The transfer velocity of ions and electrons becomes higher by using the indole trimer as an electrode material resulting in an increase in a reaction rate which makes it possible to manufacture a battery having an excellent high rate characteristic.

An indole trimer is constructed by a five-membered ring unit and a six-membered ring unit having a resonance structure over the entire main skeleton. Therefore, the indole trimer has a higher chemical stability and is hardly deteriorated compared with an electrode material which has no resonance structure in the main skeleton. Furthermore, since the indole trimer has a higher solubility in organic solvents due to the lower molecular weight compared with a polymer material and its chemical property such as solubility is unity because of its constant molecular weight, it is possible to reduce contaminants easily such as metal elements coming from oxidizing agents during preparation in addition to easy purification. It is, therefore, possible to manufacture a battery having an excellent cycle property.

EXAMPLE 2

A similar battery was manufactured as in Example 1 except for using an indole trimer consisting of a 5-cyanoindole trimer as an active material in the positive electrode material layer 2.

Charge and discharge tests were conducted according to the same method as in Example 1. A list of discharge capacities down to 0.9V is shown in Table 1. An increase in a discharge current from 1 mA/cm$^2$ to 200 mA/cm$^2$ results in a decrease in the discharge capacity from 86 mAh/g to 72 mAh/g with a decreasing rate of only 16%.

Cycle tests were conducted repeating charging up to 1.2 V and discharging down to 0.9 V at a constant charge-discharge current of 10 mA/cm$^2$. As a result of the tests the number of cycles was 25000 until the final capacity reached 80% of the initial capacity.

In a battery using an indole polymer made of the same indole monomer (Comparative Example 2), an increase in a discharge current from 1 mA/cm$^2$ to 200 mA/cm$^2$ results in 25% decrease in the capacity. On the other hand, the decrease in the capacity of this example indicates only 16% and the cycle characteristic in this example is 25000 cycles resulting in the improvement of 10000 cycles compared with that in Comparative Example 2.

EXAMPLE 3

A similar battery was manufactured as in Example 1 except for using a propylenecarbonate solution wherein 1 mol/l of tetraethylammonium tetrafluoroborate and 0.1 mol/l of trifluoroacetic acid were dissolved (hereinafter described as "PC solution").

Figure 4:
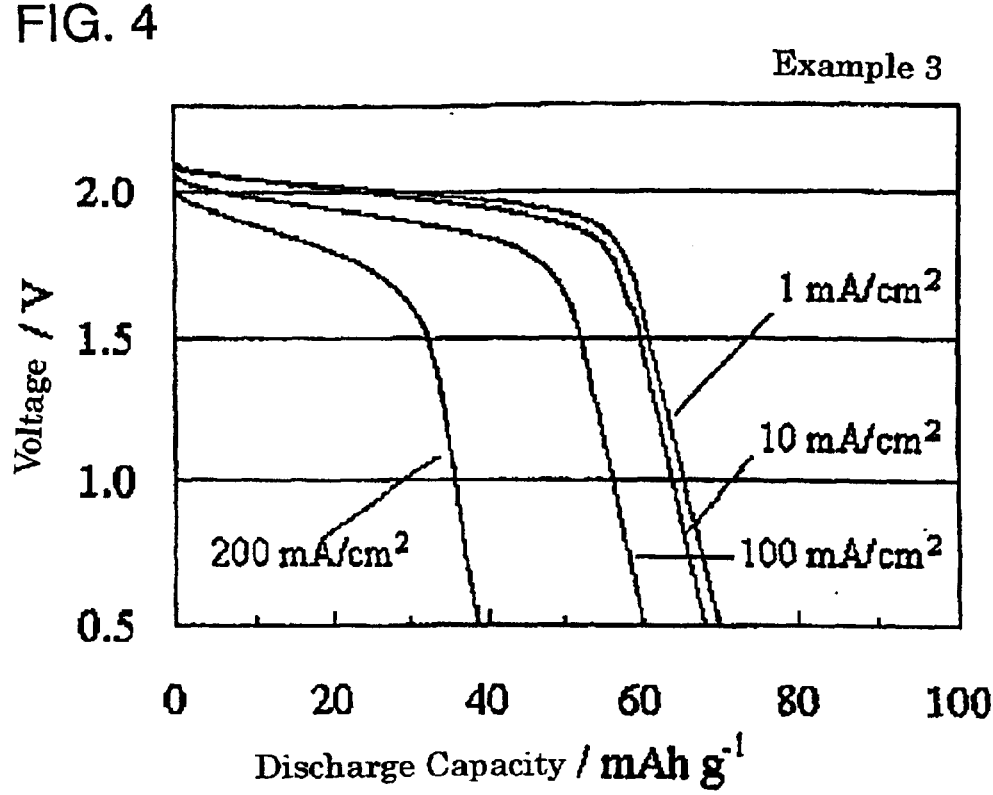
FIG. 4 is the graph showing the results of charge and discharge tests (discharge curves) of the battery in the example 3.
Figure 5:
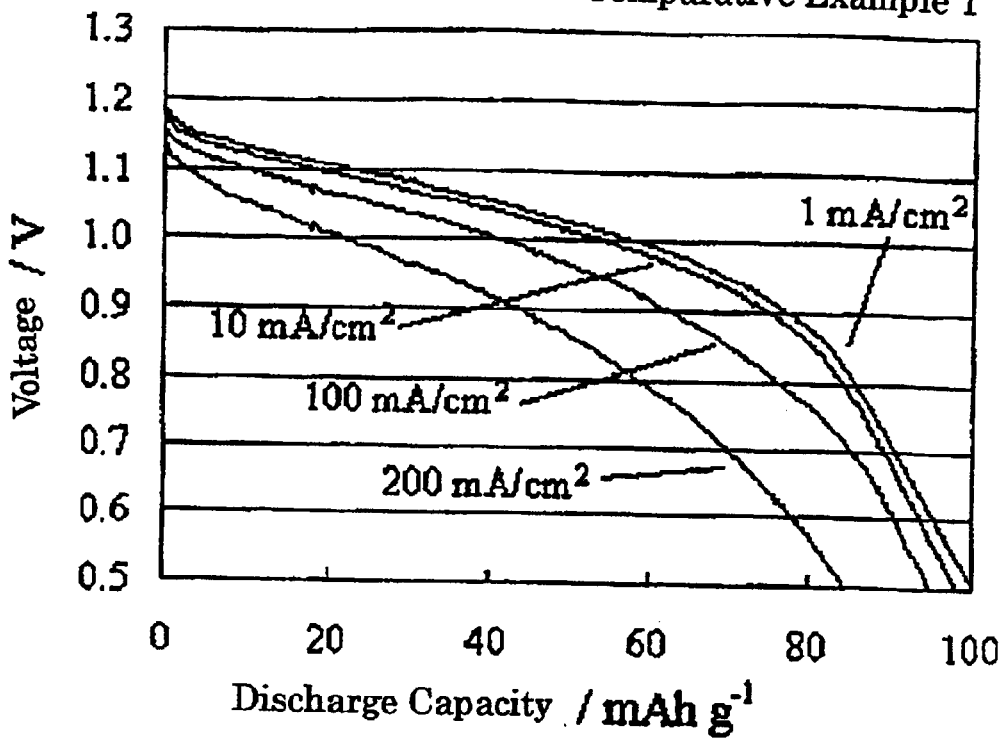
FIG. 5 is the graph showing the results of charge and discharge tests (discharge curves) of the battery in the comparative example 1.
Figure 6:
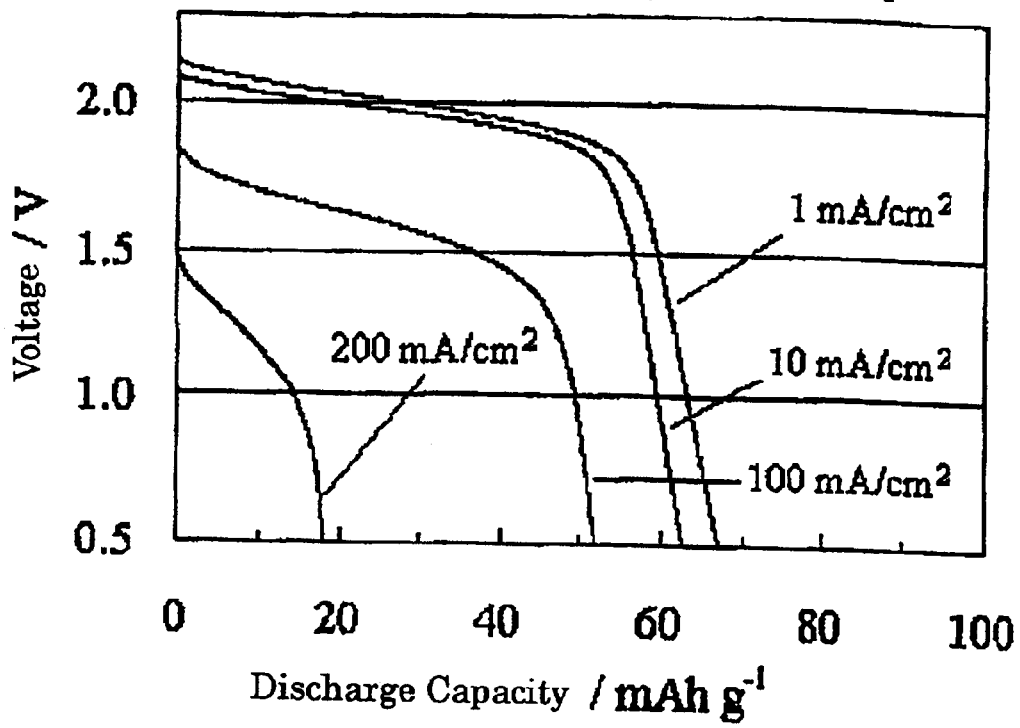
FIG. 6 is the graph showing the results of charge and discharge tests (discharge curves) of the battery in the comparative example 3.

Charge and discharge tests were conducted to evaluate the battery manufactured. The battery was charged up to 2.3 V at a constant current of 10 mA/cm$^2$ and discharged at constant currents of 1 to 200 mA/cm$^2$. The results of the tests are shown in FIG. 4 and the data of the capacities down to 0.5 V are listed in Table 1.

An increase in a discharge current from 1 mA/cm$^2$ to 200 mA/cm$^2$ results in a decrease in a discharge capacity from 70 mAh/g to 39 mAh/g indicating 44% decrease in the capacity.

Cycle tests were conducted repeating charging up to 2.3 V and discharging down to 0.5 V at a constant charge-discharge current of 10 mA/cm$^2$. As a result of the tests the number of cycles was 19000 until the final capacity reached 80% of the initial capacity.

In a battery using a PC solution as an electrolyte solution and an indole polymer made of the same indole monomer (Comparative Example 3) an increase in a discharge current from 1 mA/cm$^2$ to 200 mA/cm$^2$ results in 73% decrease in the capacity. On the other hand, the decrease in the capacity of this example indicates 44% and the cycle characteristics in this example is 19000 cycles resulting in the improvement of 7000 cycles compared with that in Comparative Example 3.

COMPARATIVE EXAMPLE 1

A similar battery was manufactured as in Example 1 except for using an indole polymer, i.e., poly-6-nitroindole as an active material in the positive electrode material layer 2.

Charge and discharge tests were conducted according to the same method as in Example 1. The tests results of discharge capacities down to 0.9V are shown in Table 1. An increase in a discharge current from 1 mA/cm$^2$ to 200 mA/cm$^2$ results in a decrease in a discharge capacity from 77 mAh/g to 44 mAh/g with a decreasing rate of 43%.

Cycle tests were conducted in the same method as in Example 1 and the test results indicated that the number of cycles was 24000 until the final capacity reached 80% of the initial capacity.

COMPARATIVE EXAMPLE 2

A similar battery was manufactured as in Example 1 except for using an indole polymer, i.e., poly-5-cyanoindole as an active material in the positive electrode material layer 2.

Charge and discharge tests were conducted according to the same method as in Example 1. The test results of discharge capacities down to 0.9V are shown in Table 1. An increase in a discharge current from 1 mA/cm$^2$ to 200 mA/cm$^2$ results in a decrease in the discharge capacity from 85 mAh/g to 64 mAh/g with a decreasing rate of 25%.

Cycle tests were conducted in the same method as in Example 1 and the test results indicated that the number of cycles was 15000 until the final capacity reached 80% of the initial capacity.

COMPARATIVE EXAMPLE 3

A similar battery was manufactured as in Example 1 except for using an indole polymer, i.e., poly-6-nitroindole as an active material in the positive electrode material layer 2 and a PC solution as an electrolyte wherein 1 mol/l of tetraethylammonium tetrafluoroborate and 0.1 mol/l of trifluoroacetic acid were dissolved.

Charge and discharge tests were conducted according to the same method as in Example 1. The test results of discharge capacities down to 0.9V are shown in Table 1. An increase in a discharge current from 1 mA/cm$^2$ to 200 mA/cm$^2$ results in a decrease in the discharge capacity from 67 mAh/g to 18 mAh/g with a decreasing rate of 73%.

Cycle tests were conducted in the same method as in Example 1 and the test results indicated that the number of cycles was 12000 until the final capacity reached 80% of the initial capacity.

TABLE 1

| | Electrode conductivity (S/cm) | Electrolyte solution | Voltage (V) | Capacity (mAh/g) | | | | Cycle property (cycle) |
|---|---|---|---|---|---|---|---|---|
| | | | | charge/discharge current density 1 mA/cm$^2$ | charge/discharge current density 10 mA/cm$^2$ | charge/discharge current density 100 mA/cm$^2$ | charge/discharge current density 200 mA/cm$^2$ | |
| Example 1 | 4.2 | aq. solution | 1.2 | 78 | 76 | 68 | 62 | 31000 |
| 2 | 5.2 | aq. solution | 1.3 | 86 | 84 | 79 | 72 | 25000 |
| 3 | 4.2 | PC. solution | 2.2 | 70 | 68 | 60 | 39 | 19000 |
| Comparative Example 1 | 2.7 | aq. solution | 1.2 | 77 | 74 | 63 | 44 | 24000 |
| 2 | 3.5 | aq. solution | 1.3 | 85 | 84 | 77 | 64 | 15000 |
| 3 | 2.7 | PC. solution | 2.2 | 67 | 63 | 52 | 18 | 12000 |

What is claimed is:

1. A secondary battery having an active material of an electrode comprising a trimer compound comprising three units of indole or indole derivatives in condensed ring form, wherein the second position and the third position of each unit form a six-membered ring, and a proton which can be utilized as a charge carrier of the trimer compound.

2. The secondary battery as claimed in claim 1, wherein the receipt and release of electrons in accordance with the oxidation-reduction reaction of the trimer compound are carried out only by the bonding and elimination of the proton bonded to the trimer compound.

3. The secondary battery as claimed in claim 1, wherein the trimer compound is represented by the following general formula (1):
wherein each R represents a hydrogen atom or a substituent, independently.

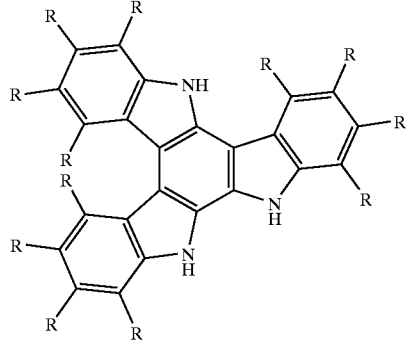

(1)

4. The secondary battery as claimed in claim 1 comprising an electrode containing 30 wt % to 95 wt % of the trimer compound.

5. The secondary battery as claimed in claim 1 comprising a solution containing $10^{-3}$ mol/l to 18 mol/l of proton as the electrolyte.

6. A secondary battery comprising:

a first electrode with a first electrode active material;

a second electrode with a second electrode active material; and an electrolyte intermediate between the first electrode and the second electrode, the electrolyte including a proton source material;

wherein the first electrode active material and the second electrode active material undergo a reversible oxidation-reduction reaction, and both or one of the first and second electrode active materials comprise a trimer compound comprising three units of indole or indole derivatives in condensed ring form, wherein the second position and the third position of each unit form a six-membered ring.

* * * * *